(12) United States Patent
Work et al.

(10) Patent No.: US 8,719,065 B2
(45) Date of Patent: May 6, 2014

(54) SYSTEM AND METHOD FOR MAXIMIZING THE VALUE OF ALLOCATION OF PROCESSES TO RESOURCES WITHIN AN OPERATIONAL SYSTEM

(75) Inventors: Paul R. Work, Bristol, RI (US); Thomas E. Wood, Portsmouth, RI (US)

(73) Assignee: Raytheon Company, Waltham, MA (US)

( * ) Notice: Subject to any disclaimer, the term of this patent is extended or adjusted under 35 U.S.C. 154(b) by 565 days.

(21) Appl. No.: 12/799,399

(22) Filed: Apr. 23, 2010

(65) Prior Publication Data

US 2011/0264476 A1    Oct. 27, 2011

(51) Int. Cl.
*G06Q 10/00* (2012.01)

(52) U.S. Cl.
USPC .......................................... 705/7.11; 705/7.12

(58) Field of Classification Search
CPC ....................................................... G06Q 10/00
USPC ................................................ 705/7.11, 7.12
See application file for complete search history.

(56) References Cited

U.S. PATENT DOCUMENTS

| | | | |
|---|---|---|---|
| 2001/0027388 A1* | 10/2001 | Beverina et al. | 703/22 |
| 2002/0133368 A1* | 9/2002 | Strutt et al. | 705/1 |
| 2006/0146053 A1* | 7/2006 | Gatewood et al. | 345/440 |
| 2008/0077368 A1* | 3/2008 | Nasle | 703/4 |
| 2008/0255881 A1* | 10/2008 | Bone | 705/3 |
| 2009/0076873 A1* | 3/2009 | Johnson et al. | 705/8 |
| 2009/0216599 A1* | 8/2009 | Robusto et al. | 705/9 |
| 2011/0264476 A1* | 10/2011 | Work et al. | 705/7.11 |

OTHER PUBLICATIONS

Generalized Lagrange Multiplier Method for solving problems of Opimum Allocation of Resoures—by Hugh Everett III Operations Research, vol. 11, No. 3 (May-Jun. 1963), pp. 399-417.*
Cobb et al., "Simulation and Optimization For Real Options Valuation", Proceedings of the 2003 Winter Simulation Conference, Dec. 7-10, 2003, pp. 343-350.
*Real Options—A Practitioner's Guide*, Copeland et al., Texere LLC, NY, NY, 2001.
Lo et al., Asset Prices and Trading Volume under Fixed Transactions Costs, J. Pol. Eco., vol. 112, No. 5, 2004, pp. 1054-1090.
*Deterministic and Stochastic Optical Control*, Fleming et al., Springer-Verlag, NY, NY, 1975.
*Introduction to the Mathematical Theory of Control Processes*, Richard Bellman, vol. 40-II, Academic Press, NY, NY, 1971.

* cited by examiner

*Primary Examiner* — Beth V Boswell
*Assistant Examiner* — Ernest A Jackson
(74) *Attorney, Agent, or Firm* — Cantor Colburn LLP

(57) ABSTRACT

A system for maximizing the value of allocation of processes to resources within an operational system includes a capability engine responsive to data representing measures of effectiveness and associated measures of performance, one or more operational objectives, and failure modes of the operational system and configured to generate workload requirements and an operational event timeline. A coarse-grained allocation engine is responsive to the workload requirements and the operational event timeline and is configured to generate a coarse-grained resource lineup and an operational value. A fine-grained optimization engine is responsive to the coarse-grained resource lineup and the operational value and is configured to generate a fine-grained resource lineup, a maximized operational value, and a total resource utilization.

23 Claims, 6 Drawing Sheets

| 28 | Land Attack Mission | |
|---|---|---|
| Mission analysis for enemy unit neutralized | MOE | ⎯24 |
| Firing rate (# guns) maximum and sustained | MOP | ⎯26 |

| 30 | Surface Warfare Dominance Mission | |
|---|---|---|
| Probability of defeating targets | MOE | ⎫ 32 |
| Probability of defeating N targets | MOE | ⎭ |
| Detection range vs surface ships | MOP | ⎫ 36 |
| First shot analysis | MOP | ⎭ |

| 37 | Air Warfare Dominance Missions | |
|---|---|---|
| Probability of Raid Annihilation | MOE | ⎯42 |
| Missile response time from detect to launch | MOP | ⎯43 |

| 40 | Undersea Warfare Dominance Missions | |
|---|---|---|
| Probability of Mission Kill vs submarine | MOE | ⎯45 |
| Probability of preventing a torpedo hit | MOP | ⎯47 |

*FIG. 2*

SYSTEM AND METHOD FOR MAXIMIZING THE VALUE OF ALLOCATION OF PROCESSES TO RESOURCES WITHIN AN OPERATIONAL SYSTEM

FIELD OF THE INVENTION

The subject invention relates to a system and method which can maximize the value of the allocation of processes to resources within an operational system.

BACKGROUND OF THE INVENTION

Some complex operational systems, such as warfighting systems, assembly line systems, pharmaceutical product systems, power plants, and the like, are responsive to measures of effectiveness (MOE) and associated measures of performance (MOP), operational objectives, and failure modes. MOEs are typically used to measure the design of the operation system and correspond to the accomplishment of operational objectives. MOPs are often used to measure the performance of the operational system.

As operational systems become more complex and the demands thereon increase, there is a need to determine as optimal a use of the available resources for the processes of operational systems which maximizes the capability of the systems and assures success of the operational objectives.

One solution may be to leverage financial oriented economic model approaches to the operational system space. It is known, for example, that the focus of the financial markets is asset allocation in order to achieve wealth gain. The optimal dynamic allocation of resources of an operational system is similar in some ways to the economic models that optimally allocate financial assets among various investment options.

One economic model presented by Low, Mamaysky, and Wang (LMW) uses a concept of transaction cost to derive an optimal investment strategy that modulates the frequency of trading. The LMW model relies on a broadly applicable mathematical field of stochastic dynamic programming. The LMW model uses continuous time and can be referred to as a "fine-grained" model.

Another economic model, known as real options analysis (ROA), can handle large, discrete time events that are often confronted with investment options with an expiration limit. In operational terms, this means looking at asset allocation to maximize operational capability. ROA can be referred to as "coarse-grained" model because it may account for coarse-grained changes, especially those that arise from planned or unplanned events.

The difficulty lies in mapping, or transforming, the economic terms from the economic models to a set of terms that apply to the operational domain of operational systems and which remain consistent across both the fine-grained and the coarse-grained models.

BRIEF SUMMARY OF THE INVENTION

In one aspect, a system for maximizing the value of allocation of processes to resources within an operational system is featured including a capability engine responsive to data representing measures of effectiveness and associated measures of performance, one or more operational objectives, and failure modes of the operational system and configured to generate workload requirements and an operational event timeline. A coarse-grained allocation engine responsive to the workload requirements and the operational event timeline and is configured to generate a coarse-grained resource lineup, and an operational value. A fine-grained optimization engine is responsive to the coarse-grained resource lineup and the operational value and is configured to generate a fine-grained resource lineup, a maximized operational value, and a total resource utilization.

In one embodiment, the capability engine may be configured to determine the proportion of each capability of each of the resources available for use by the processes based on the one or more operational objectives. The fine-grained optimization engine may be configured to generate the maximized operational value using the maximized capability of each of the resources. The workload requirements may include the requirements to be imposed on the resources in order to achieve the one or more operational objectives in accordance with the operational event timeline. The coarse-grained allocation engine may be configured to determine the coarse-grained resource lineup by allocating processes needed to accomplish the one or more operational objectives. The maximized operational value may include the accomplishment of one or more of the operational objectives. The coarse-grained allocation engine may be configured to employ a real options analysis (ROA) economic model equation. The coarse-grained allocation engine may be configured to generate an initial ROA decision matrix. The coarse-grained allocation engine may be configured to establish an initial allocation of processes to resources based on the initial ROA decision matrix. The coarse-grained allocation engine may be configured to construct a new ROA matrix using a set of operational events provided by the operational event timeline. The coarse-grained allocation engine may be configured to establish a new allocation of processes to resources based on the new ROA matrix. The coarse-grained allocation engine may be configured to account for discrete time periods between one or more events of the operational plan. The fine-grained optimization engine may be configured to employ a LMW economic model equation and an income model equation. The fine-grained optimization engine may be configured to map parameters of the economic model equation and an income model equation to operational system meaning. The fine-grained optimization engine may be configured to account for near continuous time.

In another aspect, a method for maximizing the value of allocation of processes to resources within operational system is featured, the method including establishing a set of measures of effectiveness and associated measures of performance for an operational system. One or more operational objectives and failure modes are determined for the operational system. Workload requirements and an operational event timeline are generated in response to the measures of effectiveness and associated measures of performance, operational objectives and the failure modes. A coarse-grained resource lineup and an operational value are generated in response to the operational event timeline and the workload requirements. A fine-grained resource lineup, a maximized operational value and total resource utilization may be generated in response to the coarse-grained resource lineup and the operational value.

In one embodiment, the method may include the step of determining the proportion of each capability of each resource available for use by the processes based on the one or more operational objectives. The method may include the step of maximizing the operational value using the maximized capability of each of the resources. The method may include the step of determining the coarse-grained resource lineup by allocating processes needed to accomplish the one or more operational objectives. The method may include the step of employing a real options analysis model equation. The method may include the step of constructing an initial ROA matrix. The method of claim may include the step of establishing an initial allocation of processes to resources based on the initial ROA decision matrix. The method may include the step of constructing a new ROA matrix based on a set of operational events provided by the operational event timeline. The method may include the step of establishing a new allocation of processes to resources based on the new ROA matrix. The method may include the step of employing a LMW economic model equation and an income model equation. The method may include the step of mapping parameters of the LMW economic model equation of the income model equation to operational system meaning.

In another aspect, a computer readable medium with software instructions stored thereon is configured to: establish a set of measures of effectiveness and associated measures of performance for an operational system; determine one or more operational objectives and failure modes for the operational system; generate workload requirements and an operational event timeline in response to the measures of effectiveness and associated measures of performance, operational objectives and the failure modes; generate a coarse-grained resource lineup and an operational value in response to the operational event timeline and the workload requirements; and generate a fine-grained resource lineup, a maximized operational value and total resource utilization in response to the coarse-grained resource lineup and the operational value.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which:

FIG. 2 depicts examples of MOEs and associated MOPs for the system shown in FIG. 1 instantiated as a warfighting system;

DETAILED DESCRIPTION OF THE INVENTION

Figure 1:
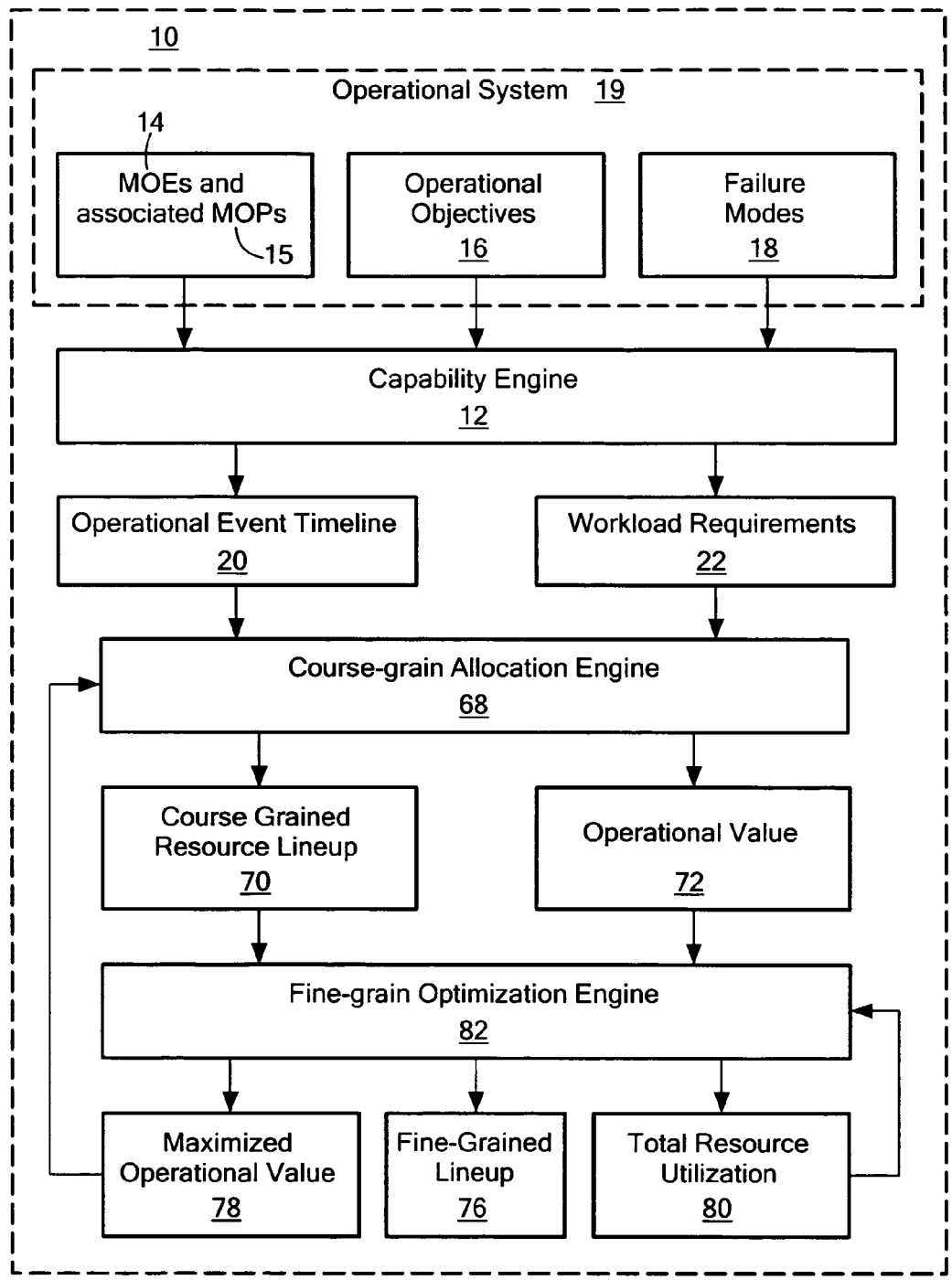
FIG. 1 is a block diagram showing the primary components of one embodiment of a system for maximizing the value of allocation of processes to resources within an operational system in accordance with an example of the invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

There is shown in FIG. 1 one embodiment of system 10 for maximizing the value of allocation of processes to resources within an operational system of this invention. System 10 includes capability engine 12, e.g., an appropriately programmed or configured processor or circuit which receives as input data representing MOEs 14 and associated MOPs 15, one or more operational objectives 16, and failure modes 18 of operational system 19. Operational system 19 may include a warfighting system, an assembly line plant, a pharmaceutical product manufacturing system, a power plant, and the like. Capability engine 12 generates and outputs operational event timeline 20, shown in greater detail in FIG. 5 (discussed below), and workload requirements 22, FIG. 1.

MOEs 14 provide a measure of the design of operational system 19 and correspond to the accomplishment of one or more operational objectives 16. MOPs 15 provide a measure of the performance of operational system 19 and may be expressed in units such as feed, payload, range, time-on-station, frequency, or any other distinctly quantifiable performance features.

FIG. 2 shows an example of a set of MOEs and MOPs that can be applied in this example to a warfighting system, e.g., a naval surface combatant operational system. In this example, MOE 24 has the associated MOP 26 for the operational or mission objective of a land attack mission 28. Similarly, surface warfare dominance operational or mission objective 30 has MOEs 32 and associated MOPs 36, air warfare dominance mission 37 has MOE 42 and MOP 43, and undersea dominance operational objectives 40l has MOE 45 and 47. The examples shown in FIG. 2 are for demonstrational purposes only, as operational system 19, FIG. 1, may have any number of MOEs and MOPs and may be utilized for any operational system which utilizes MOEs and associated MOPs, operational objectives, and failure modes, as discussed above.

Table 1 below shows in further detail a few examples of MOEs and MOPs for a warfighting system:

TABLE 1

Examples MOEs and MOPs for a warfighting system.

| Example Mission | MOE Name | MOE Definition |
|---|---|---|
| Anti-Air Warfare | P (Raid Annihilation) | Probability (P) of raid annihilation of a number targets for number of threats in number of seconds or a number of threats arriving near simultaneously |
| Anti-Submarine Warfare | P (First Attack) | Probability (P) value of first attack at a known range. |
| Torpedo Defense | P (No Hit) | Probability (P) of no hit by enemy wake homing and acoustic homing torpedoes. |
| In-Stride Mine Avoidance | P (Avoid) | Probability (P) of avoiding surface and moored mines at a known speed |

Figure 3:
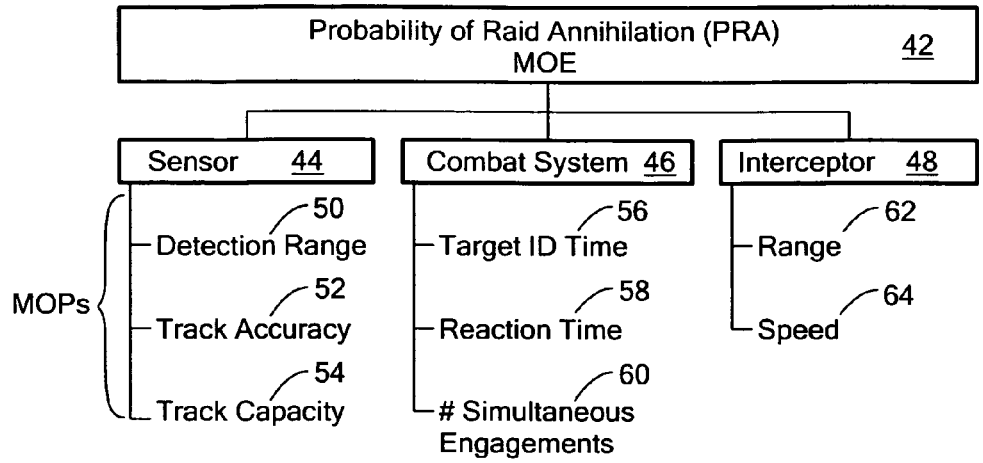
FIG. 3 shows in further detail one of the MOEs and the associated MOPs shown in FIG. 2.

FIG. 3 shows in further detail the MOE and associated MOPs for probability of raid annihilation operational objective 42, FIG. 2, and shown in Table 1 above. In this example, MOE 421 includes sensor subsystem 44, combat subsystem 46, and interceptor subsystem 48. The associated MOPs for sensor subsystem 44 of MOE 42 include detection range 50, track accuracy 52, and track capability 54. The associated MOPs for combat subsystem 46 include target ID time 56, reaction time 58, and number of simultaneous engagements 60. The associated MOPs for interceptor subsystem 48 include range 62 and speed 64.

Thus, MOPs are a performance characteristic that are used to determine the capability of operational system 19, FIG. 1, and MOEs needed to achieve operational objective 16.

In order to show the correspondence between the allocation of processes to resources (asset allocation) within operational system 19 using economic models, workload requirements 22 generated by capability engine 12 need to be defined in the operational system domain. This is because system 10 preferably maps "currency" found in the financial domain to the "currency" used in the operational system domain. As used herein, workload requirements means the amount of work needed to be performed by an operational system 19 to accomplish one or more operational objectives 16 in accordance with operational event timeline 20. Each resource of operational system 19 has a certain workload capacity.

In order to determine the correspondence between the allocation of processes to resources within an operational system using economic models, a few mathematical definitions of terms is needed. The System Effectiveness ($E_s$) of a resource is a function of Capability, Reliability, and Availability of the resource, a shown by equation (1) below:

$$E_s = f(C, R, A) \qquad (1)$$

where $$E_s = C_o R_o A_o \qquad (2)$$

for all elements/components within an operational system.

Reliability, $R=R(t)$, is the probability that a component or resource survives for t time units. It is common to assert:

$$R(t) = e^{-\lambda t} \qquad (3)$$

Availability, A, is computed using the formula:

$$A = \frac{MTBF}{MTBF + MTTR + MLDT} \qquad (4)$$

where MTBF is equal to the mean time between failure=$1/\lambda$, MTTR is equal to the mean time to repair, MLDT is equal to mean logistics delay time, MTTR+MLDT is equal to Interruption of Services (IOS), and for software, MTTR is the restart time and MLDT=0 (provided sufficient hardware is available).

Capability, C, is a set of mission functions and has been defined mathematically by several equivalent formulae that result in somewhat different numerical values, but maintain the behavior of increasing capability when input variables improve. If we take Ci to be equal to the proportion of capacity, throughput, or utilization of some Capability i ($0 \leq C \leq 1$), then capability engine 12 can determine the proportion of each capability to be delivered by of each of the resources available for use by the processes of operational system 19 based on operational objectives 16 using the equation:

$$C_i = 1 - \Sigma FM_j \qquad (5)$$

where FMj is the proportion of capability lost in the $j^{th}$ failure mode of the $i^{th}$ capability and ($0 \leq FMj \leq 1$ and $\Sigma FMj=1$). Therefore, if there is no degradation in Ci, then, $\Sigma FMj$ is equal to 0 and Ci is equal to 1. If Ci has completely failed, $\Sigma FMj$ is equal to 1, and Ci is equal to 0.

Then:

$$C_o = \prod_1^n \omega_i C_i \qquad (6)$$

$$R_o = \prod_1^n (R_i | A_i) \qquad (7)$$

$$A_o = \prod_1^n A_i \qquad (8)$$

where $\omega_i$ is the weight (e.g., importance) of the ith capability with respect to the all other capabilities.

As discussed above, MOEs are functions of the MOPs. MOEs provide a description of a capability, at various levels of granularity. This granularity may be any component of an operational system, e.g., in the warfighting domain, such as a single sensor or effecter, or at a major platform, such as, a surface combatant, level of detail.

MOEs therefore apply directly to the $C_o$ portion of the $E_s$ equation (2) above in the following manner:

$$C_i = \prod_{k=1}^m \psi_k^i \overline{MOE_k^i} \qquad (9)$$

where $\psi_k^i$ is the weight of the $k^{th}$ MOE with respect to all other MOEs that apply to the $i^{th}$ capability. The bar over MOE indicates a normalization:

$$\overline{MOE_k^i} = \frac{MOE_k^i}{\prod_{j=1}^m MOE_j^i} \qquad (10)$$

where the product in the denominator of equation (10) is over all MOEs that apply to the $i^{th}$ capability. With the normalization of MOEs, all MOEs in the denominator of equation (10) product must be positive and if $0 < \psi \leq 1$ for all k, then $0 < C \leq 1$, as in equation (5) above.

Preferably, capability engine 12 determines the capability of operational system 19 using equation (9), above uses the value of $\psi_k^i$ based on the operational objectives 16 presented to it.

As shown above, there is a relationship between $C_i$ and MOEs and therefore to the capacity or utilization of a capability.

Next, the work that is necessary to accomplish a set of activities needs to be stipulated. This requires consumption of some capacity or will achieve some level of utilization of a resource or set of resources. Then, it is further stipulated that to achieve some measure of effectiveness, some sort of work in the form of some set of activities needs to be accomplished. Performing this work and thus completing these activities will therefore consume some capacity or will achieve a certain level of utilization of resources. This consumption or utilization preferably generates an operational value of the operational system in the form of accomplishment of the mission objectives.

Then, the economic models, discussed below, provide for achieving maximization of the operational value of the consumption or workload requirements to the benefit of the user of the operational system via the maximization of the allocation of processes to the available resources of the operational systems.

Figure 4:
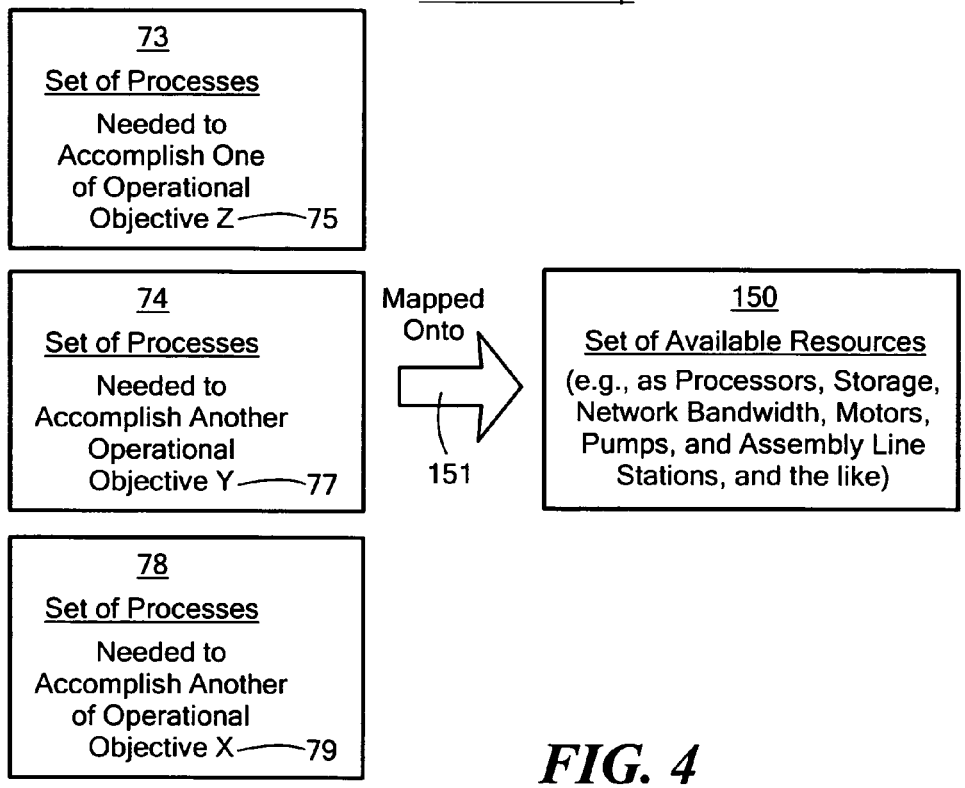
FIG. 4 is a block diagram showing one example of generic mapping of a set of processes to a set of available resources for the operational system shown in FIG. 1.

System 10 for maximizing the value of allocation of processes to resources with an operational system includes coarse-grained allocation engine 68, FIG. 1, e.g., an appropriately programmed or configured processor or circuit, which receives as input operational event timeline 20 and workload requirements 22. Coarse-grained allocation engine 68 generates and outputs coarse-grained resource lineup 70 and operational value 72. FIG. 4 shows an example of resource lineup 70 which, in this example, includes set of processes 73 needed to accomplish operational objective Z-75 of operational objectives 16, FIG. 1, set of processes 74, FIG. 4, needed to accomplish operational objectives Y-77, and set of processes 78 needed to accomplish yet another operational objectives X-79. Coarse-gained allocation engine 68, FIG. 1, preferably determines coarse-grained resource lineup 70 by allocating, or mapping, the processes of operational system 19 needed to accomplish operational objectives 16 to the resources of operational system 19. In this example, coarse-gained allocation engine 68 maps set of processes 73, 74, and 78, FIG. 4, with operational objectives Z-75, Y-77, and X-79, respectively, to set of available resources 150, as shown at 151. Coarse-grained allocation engine 68 computes and outputs operational value 72 which preferably includes the ability of operational system 19 to accomplish operational objectives 16. Exemplary processes for operational system 19 when system 10 is instantiated as a warfighting system may include planning, situational awareness, engagement, and the like. Exemplary processes for operational system 19 when system 10 is instantiated as a power plant may include start-up, place in maintenance, synchronize generators, and the like. Similar type processes for system 10 instantiated as an assembly line plant, a pharmaceutical product manufacturing plant, and the like, are known by those skilled in the art. Examples of resources used by operational system 19 when system 10 is instantiated as a warfighting system may include sensors, weapons, engines, processors, and the like. Examples of resources used by operational system 19 when system 10 is instantiated as a power plant may include generators, converters, distribution lines, processors, and the like. Other available resources for operational system 19 may include processors, storage, network bandwidth, motors, pumps, assembly line stations, single board computers, microcontrollers, shelves of blade processes, individual cores of multi-core processes, all of which may be connected via some form of communication fabric, storage, such as non-volatile and volatile storage means, motors, pumps, electric or other propulsion driven motors and fluid pumps, assembly line stations in which the various work locations are connected via moving mechanisms, e.g., belts, motors, and the like, the various components of pharmaceutical systems and power plants, and the like.

Figure 5:
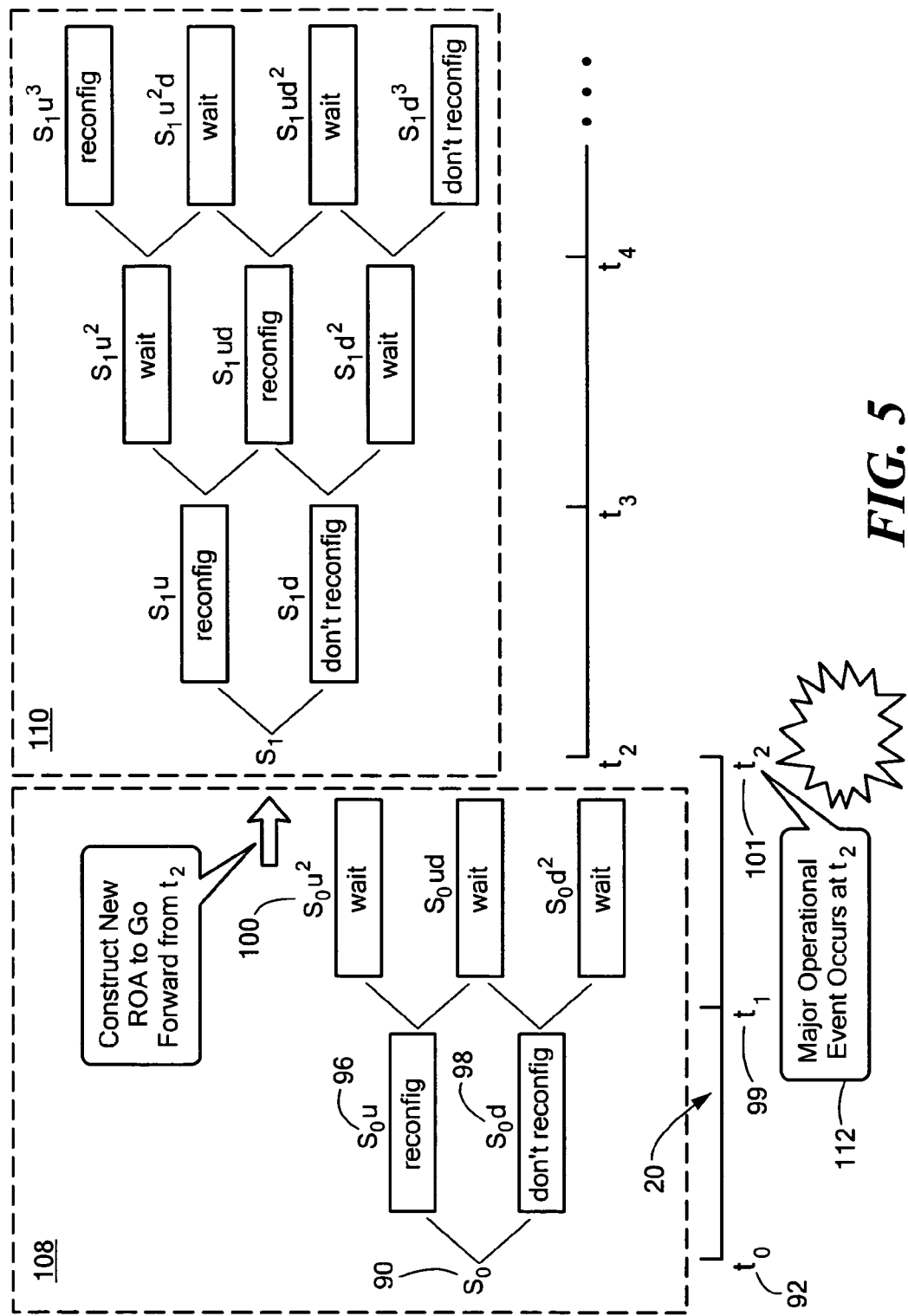
FIG. 5 is a block diagram depicting examples of ROA matrices generated by the coarse-grained allocation engine shown in FIG. 1.
Figure 6:
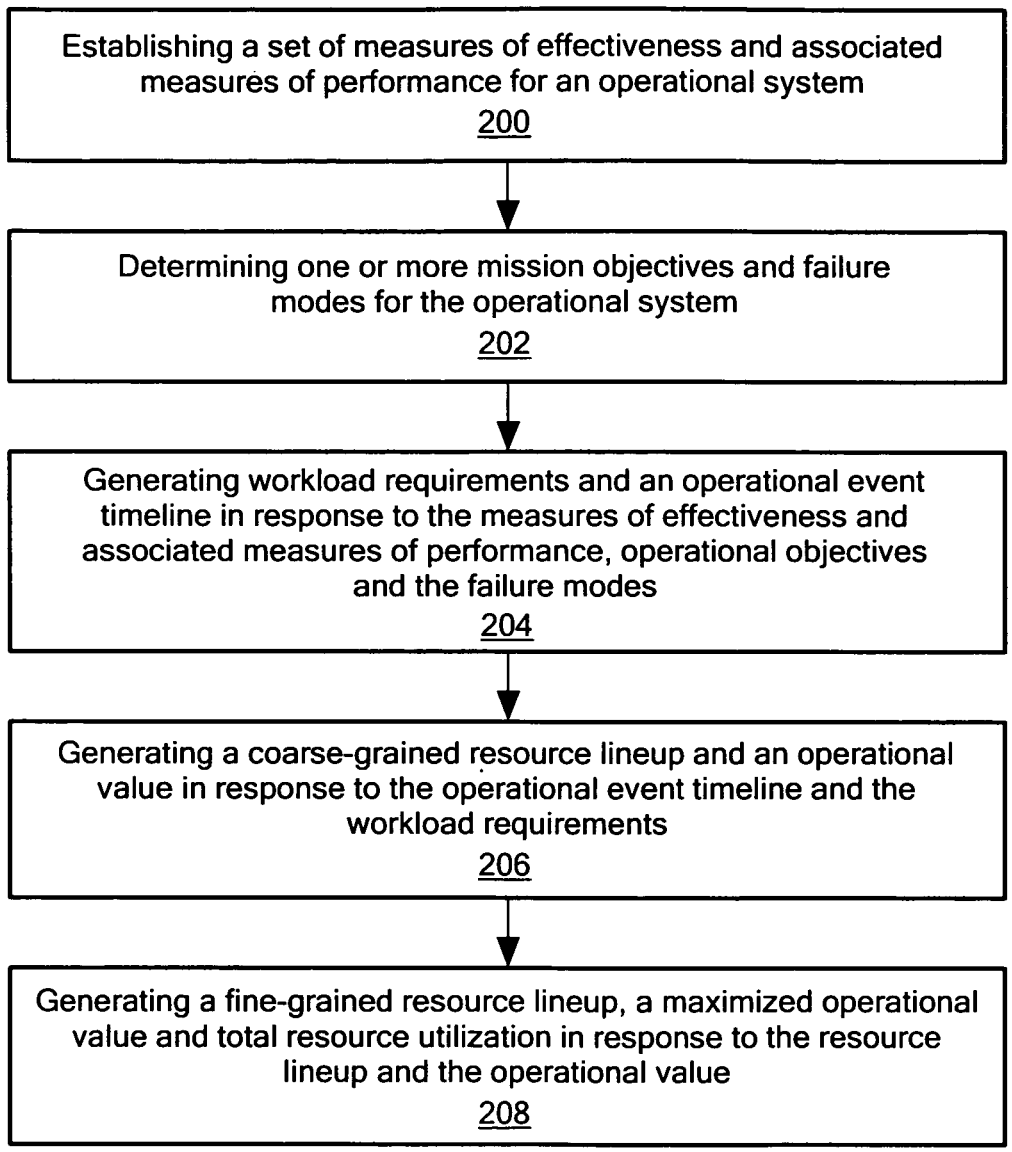
FIG. 6 is a flowchart showing the primary steps of one embodiment of an example of a method for maximizing the value of allocation of processes to resources with in an operational system according to the invention.

Coarse-grained allocation engine 68 preferably uses a real options analysis (ROA) economic model to construct an initial ROA matrix, e.g., ROA matrix 108, FIG. 5. Coarse-grained allocation engine 68 preferably establishes an initial allocation of processes to resources (i.e., coarse-grained resource lineup 70, FIG. 1) of operational system 19 based on initial ROA decision matrix 108. For example, $S_0$-90 is a state at time $t_0$-92 for operational event timeline 20. System 10 can either reconfigure the resources of operational system 19 to meet one of operational objectives 16, as shown at state $s_0u$-96, or not reconfigure the resources as shown at state $S_0d$-98. As shown at time $t_1$-99, states: $s_0u^2$-100, $s_0d$-102, and $s_0ud$-104 are waiting.

In economic terms, operational event timeline 20, FIG. 5, is equivalent to a net present value. A major operational event, or a set of operational events, observed by the operational system 19 triggers coarse-grained allocation engine 68, FIG. 1, to construct a new ROA matrix, e.g., ROA matrix 110, FIG. 5. In this example, major operational event 112 at time $t_2$-101 triggers coarse-grained allocation engine 68 to generate a new ROA matrix 110. Coarse-grained allocation engine 68 then establishes a new allocation of processes to resources, coarse-grained resource lineup 70, FIG. 1, of operational system 19 based on the new ROA matrix 110. As shown above, coarse-grained allocation engine 68 preferably accounts for discrete period of times between one or more mission events.

System 10 further includes fine-grained optimization engine 82, e.g., an appropriately programmed or configured processor or circuit, which receives as input coarse-grained resource lineup 70 and operational value 72 and generates and outputs fine-grained resource lineup 76, maximized operational value 78 and total resource utilization 80. Fine-grained resource lineup 76 is preferably configured to maximize or tune the allocation of processes to resources of operational system 19. Fine-grained optimization engine 82 maximizes operational value 72 using the maximized capability of each of the resources available to operational system 19. The output of fine-grained optimization engine 82 may be displayed on a monitor or similar device and/or generated as a report.

Fine-grained optimization engine 82 preferably uses the LMW economic model equation:

$$M_t^i = \int_0^t (rM_s^i - c_s)ds + \int_0^t (\theta_s^i dD_s + dN_s^i) -- \sum_{\{k:0 \leq \tau_k^i \leq t\}} (P_{\tau_k^i} \delta_k^i + \kappa_k^i) \quad (11)$$

where M represents liquid wealth that provides a non-stochastic rate of return r at a predetermined point in time t, c is a stochastic function that represents liquid wealth diminished by consuming wealth or by buying stocks at a discrete stochastic time $\tau$, $\theta$ represents the number of stock shares held, i indicates one of two agents in the economic model, N represents income, P is the stock price, $\delta$ is the number of shares in the trades, $\kappa$ is the cost of the transaction, and D is the dividend per share.

M (liquid wealth) may be considered to be bonds that can provide a non-stochastic rate of return r. Any cash generated from any source is typically immediately turned into bonds. Liquid wealth is diminished either by consuming wealth according to the stochastic function, c, or by buying stocks at a discrete stochastic time $\tau$. The accumulated dividends from each share of risky stock may be given by the sum of linear (non-stochastic) return plus a term following a scaled Brownian motion, $B_{1t}$. The variable $\theta$ in equation (11) represents the number of stock shares held and can vary over time as stocks are bought and sold. The superscript i indicates one of two "agents" in the economic model. The accumulated dividend wealth of agent, i, can thus be represented by equation (12) below:

$$\int_0^t \theta_s^i dD_s, \quad (12)$$

where the integral is interpreted as a stochastic Itô integral.

In one embodiment, fine-grained optimization engine 82, FIG. 1, determines the risks and income between agents using the income model equation:

$$N_t^i = -\int_0^t (-1)^i \sigma_x B_{2s} dB_{1s}, \quad (13)$$

where B is the uncertainty in the economy and $\sigma_x$ is the dividend on the uncertainty of the risky security. The risk in the income is balanced between the agents, therefore $N_t^1 = -N_t^2$. Because both N and accumulated dividend income are driven by the same Brownian motion $B_{1t}$, the risk in the income, N, and the stock market dividend fluctuations are correlated. For example, the linkage between one agent's risky income (agent 1), dividend risk and another agent's risk (agent 2) leads to agent 2's willingness to buy/sell whenever agent 1 wants to sell/buy. This is one aspect of market equilibrium (balance between Supply and Demand).

The last term in equation LMW equation (11) above, the summation term, is the liquid wealth change due to buying or selling stocks. For the summation term, the stock price is P, the number of shares in the trade is $\delta$, and the cost of the transaction is $\kappa$. To keep the market balanced, the number of shares sold by one agent is typically equal to the number of shares bought by the other at the same time. This means the transaction costs can vary with time or with the buyer or the seller. A constant transaction cost is used to and simplify the analysis. The basic choices in the model for each agent in the economy are to choose a consumption function and a trading strategy that determines the times $\tau$ at which trades will occur based on past market behavior. It can vary over time as stocks are bought and sold.

LMW equation (11) above used by fine-grained optimization engine 82 preferably evaluates utility as a function of consumption of resources using the equation:

$$u(c) = -E_0\left[\int_0^\infty e^{-\rho s - \gamma c_s} ds\right] \quad (14)$$

where c is a random value variable for consumption, $\rho$ is primarily a time scaling parameter, and $\gamma$ is a risk aversion parameter which can be configured for appropriate behavior. Fine-grained optimization engine 82 preferably accounts for a near continuous time.

The economic meaning of each of the parameters of equations (11), (13), and (14) are shown in Table 2 below:

TABLE 2

Parameter Translation Table: Economic Model to Operational Value Model

| Parameter | Economic Meaning | Operational Value Meaning | Deterministic/ Stochastic | Units (in the Operational Domain) |
|---|---|---|---|---|
| M | Wealth | Total resource utilization in an operational system | S | Workload Capacity |
| r | Rate of return from non-risky assets (Bonds) | Rate of return in resources to effect | D (Constant) | No Units |
| c | Consumption | Consumption of Resources | | Workload Demand |
| $\tau$ | Trading times | Resource re-allocation times | S | Time |
| P | Price of risky asset (stock price) | Utilization of a unit of resource | D (Constant) | Workload per unit of resource |
| $\delta$ | Amount of risky asset traded | Resources that may be re-allocated | D (Constant) | Resource unit |
| N | Non-traded Risky Income | Value of accomplishing some operation | S | Workload Demand |
| $\theta$ | Units of risky asset held | Units of resources allocated to operations | S | Resource Units |
| D | Dividend per share of risky stock | Operational value per unit of resource | S | Workload per unit of resource |
| $\kappa$ | Cost of trading risky asset (stock) | Work required to reallocated | D (Constant) | Workload |
| z | Net risk exposure | Mean or Expected Operational Workload | S | Resource units |
| B | Uncertainty in economy | Uncertainty in operation | S | No Units |
| $\overline{a_D}$ | Mean dividend on the tradeable portion of the risky security | Expected Operational value (e.g., Contact Volume, or some subset of External Operational Actions Requests) per unit of resource | D/S (Constant in LMW, stochastic in ROA) | Workload per unit of resource |
| $\sigma_D$ | Dividend on the uncertain portion of the risky security | Configuration line-up rate of return | D/S (Constant in LMW, stochastic in ROA) | No Units |
| $S_0$ | Initial underlying asset investment | Current Operational Value | D | Workload |

In order to use the economic models discussed above in the operational system domain space, fine-grained optimization engine 82 maps the economic meaning of each of the parameters shown in Table 2 to operational value meaning. Table 2 shows the results of this mapping where: M is the total resource utilization in an operational system, r represents the rate of return in resources to effect, c is the consumption of resources, $\kappa$ indicates the work required to be re-allocated, P represents the utilization of a unit of resource, $\delta$ represents resources that may be re-allocated, N represents the value of accomplishing some operation, $\theta$ represents the units of resources allocated to operations, D represents the operational value per unit of resource, κ represents the work required to reallocate, B represents the uncertainty in operation, τ represents the resource reallocation times, $\sigma_D$ represents the configuration lineup rate of return, and $S_0$ represents the current operational value. z represents the mean or expected operational workload and $a_D$ represents the expected operational value, such as contact volume or some number of external operations action requests, per unit of resource.

Thus, system 10 has effectively transformed economic model equations to the operational domain to maximize the value of the allocation of processes to resources within an operational system.

The method for maximizing the value of allocation of processes to resources within an operational system of this invention includes establishing a set of measures of effectiveness and associated measures of performance for an operational system, step 200, FIG. 8. One or more mission objectives and failure modes are determined for the operational system, step 202. Workload requirements and an operational event timeline are generated in response the measures of effectiveness and associated measures of performance, the operational objectives and the failure modes, step 204. A coarse-grained resource lineup and an operational event timeline are generated in response to the workload requirements and the operational event timeline, step 206. A fine-grained resource lineup, a maximized operational value, and a total resource utilization are generated in response to the coarse-grained resource lineup and the operational value, step 208.

Figure 7:
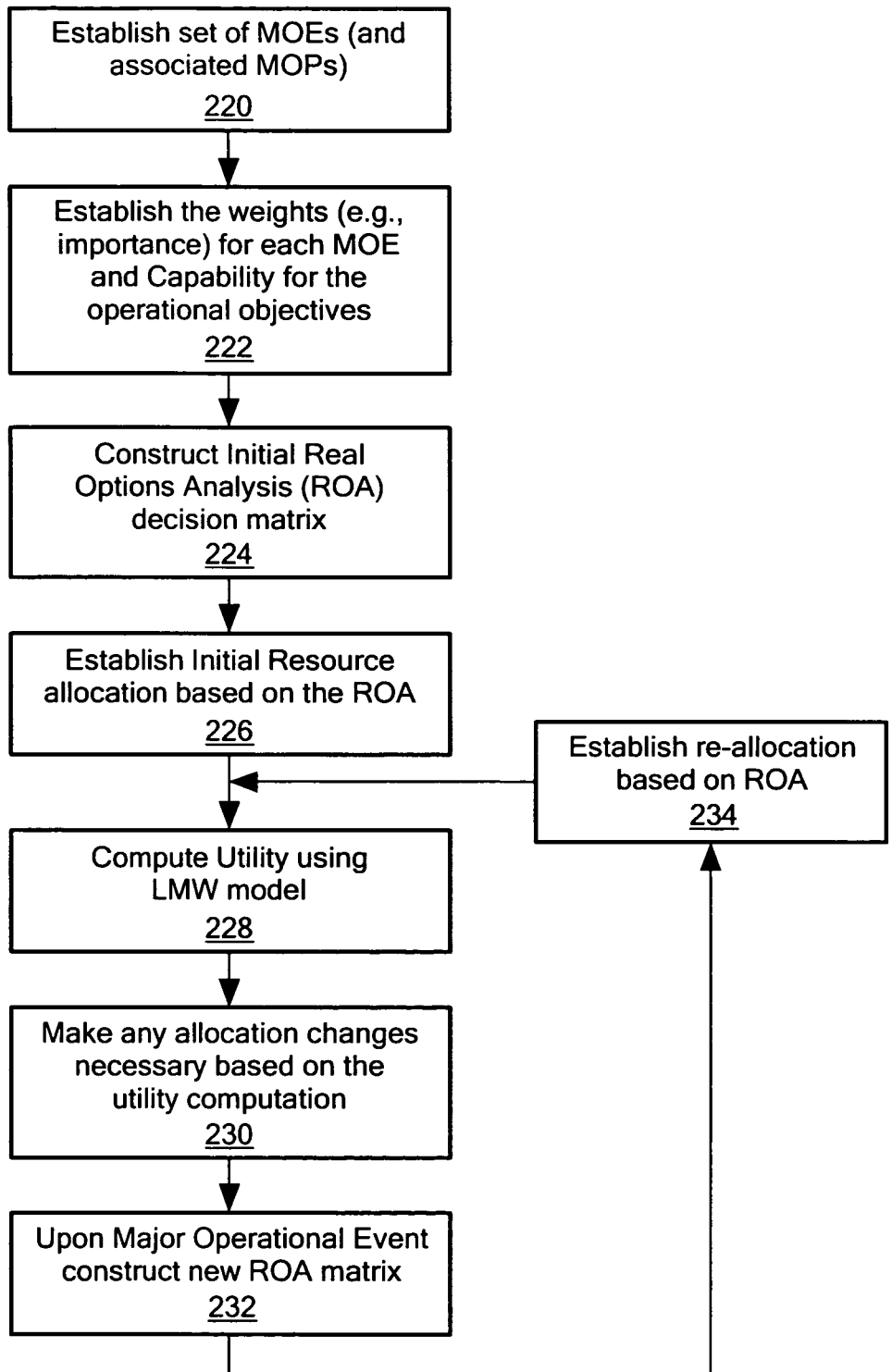
FIG. 7 is a flowchart showing in further detail the steps of the method for maximizing the value of allocation of processes to resources shown in FIG. 6.

FIG. 7 shows in further detail one embodiment of the method of maximizing the value of allocation of processes to resources within an operational system of this invention. In this example, a set of MOEs and associated MOPs is established, step 220. Weights of importance for each MOE and the capability for operational objectives are then established, step 222. An initial ROA decision matrix, e.g., ROA matrix 108, as discussed above with reference to FIG. 5, is constructed, step 224, FIG. 7. An initial resource allocation is then established based on the ROA decision matrix, step 226. The utility is computed using the LMW model, step 228, e.g., as discussed above with reference to equations (11) to (14). Any allocation changes necessary based on the utility computation are then performed, step 230. Upon a major operational event, a new ROA matrix is constructed, step 232, e.g., matrix 110, as discussed above with reference to FIG. 5. This leads to establishment and re-allocation based on the ROA matrix, step 234. This leads back to step 228.

Software instructions to perform the various embodiments discussed herein may be stored on a computer readable medium such as a compact disc (CD), a diskette, random access memory, read only memory, an optical device, a tape, or any other tangible computer readable storage device.

The result is system 10 provides a two tiered fine-grained and coarse-grained approach to asset allocation for optimizing the value of allocation of processes to resources within an operational system. The fine-grained approach leverages the LMW model using a concept of transactions costs to derive an optimal investment strategy by moderating trading (re-allocation). The continuously monitoring LMW economic model is coupled with the ROA economic model for coarse-grained changes, especially those that arise from planned events or rare, unplanned events. The LMW model addresses a number of issues with respect to the value of allocation of processes to resources in the operational system space. System 10 addresses value creation in a rationale manner by inclusion of consumption of resources, and does so in a "bounded" fashion within a stochastic framework that seeks to maintain equilibrium. The ROA asset allocation then provides another level of decision making that provides a valuation capability, extending the Black-Scholes economic model to support evolutionary decision making processes that can be leveraged into the operational system space. System 10 also maps economic parameters from the financial domain to a set of parameters that apply to the operation system domain and which remains consistent across the both fine-grained and coarse-grained models. Where in the financial oriented economic models, the basic units are currency, the LMW and ROA economic models used by system 10 are workload. Thus, system 10 can identify consumption as workload requirement. MOEs and their associated MOPs are also related to constructs of system effectiveness models. These constructs then relate to the economic models and shows that system 10 can apply the economic models to the challenge of making resource allocation decisions that maximize value within an operational system utilizing well-established paradigms of operational system reliability and the advances in economic modeling using the mathematics of stochastic control and decision theory.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A system for maximizing the value of allocation of processes to resources within an operational system comprising:
a processor operative to process the functions of a capability engine responsive to data representing measures of effectiveness identifying at least one sub-system of the operational system, and associated measures of performance identifying a performance of at least one component of the at least one sub-system identified by the measure of effectiveness of the operational system, one or more operational objectives corresponding to the measures of effectiveness, and failure modes of the operational system, and configured to generate workload requirements based on the measures of effectiveness and to generate an operational event timeline corresponding to the operation objectives, the measures of effectiveness being a function of the measures of performance,
the system further comprising a two-tiered grain system, the two-tiered grain system including:
a coarse-grained allocation engine that accounts for event changes at a finite time and is responsive to the workload requirements and the operational event timeline and configured to generate a coarse-grained resource lineup by allocating processes needed to accomplish the one or more operation objected, and an operational value;

a fine-grained optimization engine that accounts for event changes over continuous time and is responsive to the coarse-grained resource lineup and the operational value and configured to generate a fine-grained resource lineup, a maximized operational value using the maximized capability of each of the resources, and a total resource utilization, wherein the system includes a display device operative to output the fine-grained resource lineup to a user.

2. The system of claim 1 in which the capability engine is configured to determine the proportion of each capability of each of the resources available for use by the processes based on the one or more operational objectives.

3. The system of claim 1 in which the workload requirements include the requirements to be imposed on the resources in order to achieve the one or more operational objectives in accordance with the operational event timeline.

4. The system of claim 1 in which the maximized operational value includes the accomplishment of one or more of the operational objectives.

5. The system of claim 1 in which the coarse-grained allocation engine is configured to employ a real options analysis (ROA) economic model equation.

6. The system of claim 5 in which the coarse-grained allocation engine is configured to generate an initial ROA decision matrix.

7. The system of claim 6 in which the coarse-grained allocation engine is configured to establish an initial allocation of processes to resources based on the initial ROA decision matrix.

8. The system of claim 7 in which the coarse-grained allocation engine is configured to construct a new ROA matrix using a set of operational events provided by the operational event timeline.

9. The system of claim 8 in which the coarse-grained allocation engine is configured to establish a new allocation of processes to resources based on the new ROA matrix.

10. The system of claim 1 in which the coarse-grained allocation engine is configured to account for discrete time periods between one or more events of the operational plan.

11. The system of claim 1 in which the fine-grained optimization engine is configured to employ an LMW economic model equation and an income model equation.

12. The system of claim 11 in which the fine-grained optimization engine is configured to map parameters of the economic model equation and an income model equation to operational system meaning.

13. The system of claim 12 further including the step of employing a real options analysis model equation.

14. The system of claim 12 further including the step of constructing an initial ROA matrix.

15. The system of claim 14 further including the step of establishing an initial allocation of processes to resources based on the initial ROA decision matrix.

16. The system of 15 further including the step of constructing a new ROA matrix based on a set of operational events provided by the operational event timeline.

17. The system of claim 16 further including the step of establishing a new allocation of processes to resources based on the new ROA matrix.

18. The system of claim 1 in which the fine-grained optimization engine is configured to account for near continuous time.

19. A method for maximizing the value of allocation of processes to resources within an operational system, the method comprising:

establishing a set of measures of effectiveness identifying at least one sub-system of the operational system, and associated measures of performance identifying a performance of at least one component of the at least one sub-system identified by the measure of effectiveness of the operational system;

determining one or more operational objectives corresponding to the measures of effectiveness and failure modes of the operational system;

generating workload requirements based on the measures of effectiveness, and generating an operational event timeline corresponding to the operation objectives with a processor in response to the measures of effectiveness and associated measures of performance, operational objectives and the failure modes, the measures of effectiveness being a function of the measures of performance, the method further comprising executing operations of a two-tiered grain system, the operations including:

generating in response to the operational event timeline and the workload requirements a coarse-grained resource lineup by allocating processes needed to accomplish the one or more operational objectives and an operational value generating in response to the coarse-grained resource lineup and the operational value a fine-grained resource lineup, a maximized operational value for maximizing the operational value using the maximized capacity of each of the resources and total resource utilization and outputting the fine-grained resource lineup to a user on a display.

20. The method of claim 19 further including the step of determining the proportion of each capability of each resource available for use by the processes based on the one or more operational objectives.

21. The method of claim 19 further including the step of employing a LMW economic model equation and an income model equation.

22. The method of claim 21 further including the step of mapping parameters of the LMW economic model equation of the income model equation to operational system meaning 23. A non-transitory computer readable medium with software instructions stored thereon configured to:

establish a set of measures of effectiveness identifying at least one sub-system of the operational system and associated measures of performance identifying a performance of at least one component of the at least one sub-system identified by the measure of effectiveness of the operational system;

determine one or more operational objectives corresponding to the measures of effectiveness and failure modes of the operational system;

generate workload requirements based on the measures of effectiveness, and generating an operational event timeline corresponding to the operation objectives with a processor in response to the measures of effectiveness and associated measures of performance, operational objectives and the failure modes, the measures of effectiveness being a function of the measures of performance, the software instructions configured to execute operations of a two-tiered grain system, the operations including:

generate in response to the operational event timeline and the workload requirements a coarse-grained resource lineup by allocating processes needed to accomplish the one or more operational objectives and an operational value generate in response to the coarse-grained resource lineup and the operational value a fine-grained resource lineup, a maximized operational value and total resource utilization for maximizing the operational value using the maximized capacity of each of the resources and output the fine-grained resource lineup to a user on a display.

* * * * *